R. E. HALL.
RECORDER.
APPLICATION FILED JULY 31, 1915.

1,213,356.

Patented Jan. 23, 1917.

Witnesses:

Inventor:
Ray E. Hall
By Wm. H. Bell Atty.

UNITED STATES PATENT OFFICE.

RAY E. HALL, OF ANN ARBOR, MICHIGAN, ASSIGNOR OF ONE-HALF TO CHARLES A. ROBERTSON, OF ANN ARBOR, MICHIGAN.

RECORDER.

1,213,356.  Specification of Letters Patent.  Patented Jan. 23, 1917.

Application filed July 31, 1915. Serial No. 42,873.

*To all whom it may concern:*

Be it known that I, RAY E. HALL, a citizen of the United States, residing at Ann Arbor, in the county of Washtenaw and State of Michigan, have invented certain new and useful Improvements in Recorders, of which the following is a specification.

This invention relates in general to recorders adapted to produce a permanent record of the successive current impulses which are utilized to express ideas telegraphically and more particularly to that type of recorders which produce a continuous line record. Recorders of this character previously in use have generally been provided with a pen or stylus constantly supplied with ink from a suitable source and movable under the influence of current impulses to produce markings on a moving tape which are intelligible to persons familiar therewith. These forms of recorders have been subject to the disadvantage that the movable pen is either of such light and delicate construction that it requires constant observation and attention, or is of such heavy construction that it fails to produce a clear and distinct impression. With such recorders it has been impossible to produce a distinct and accurate record with great rapidity.

The primary object of my invention is, therefore, to provide a recorder of simple and substantial construction which will operate with great rapidity and produce a clear, distinct and accurate record.

A further object of my invention is to provide a recorder of simple construction which overcomes the disadvantages of previously known forms of recorders by utilizing a stationary pen and means for moving the tape laterally as well as longitudinally under the pen which constantly engages the moving tape.

Other objects and advantages of my invention will be apparent as it is better understood by reference to the following specification when read in connection with the accompanying drawing in which—

Figure 1:
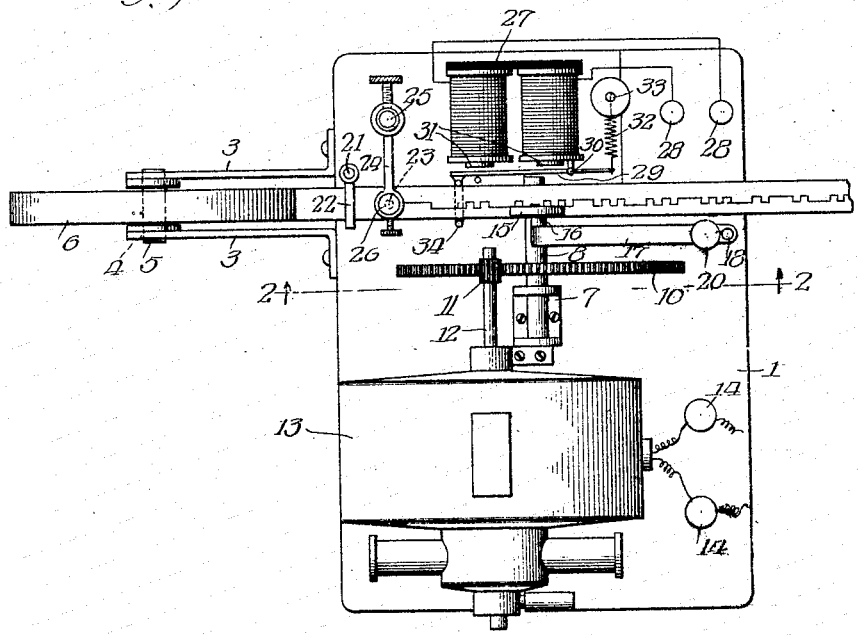
Figure 2:
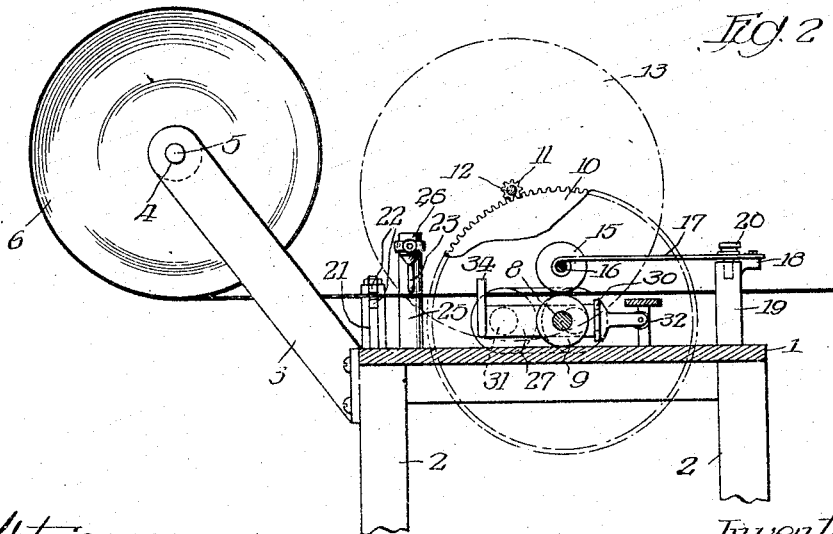

Figure 1 is a plan view of a recorder constructed in accordance with my invention, and Fig. 2 is a vertical section on the line 2—2 of Fig. 1.

Referring to the drawing, 1 indicates a suitable base which may be supported on standards 2 and which in turn serves to support the mechanism of the recorder. Secured to the base 1 are the brackets 3 having bearings 4 to receive the spindle 5 of the tape roll 6. A bracket 7, secured to the base, provides a spindle 8 upon which a roller 9, over which the tape is disposed when the instrument is in operation, is rotatably mounted. The spindle 8 is provided with a gear 10 which meshes with a pinion 11 on the shaft 12 of a constant speed motor 13. The motor 13 in the present embodiment of my invention is electrically driven through current supplied from any source of power, the binding posts 14 being mounted on the base 1 and adapted to secure the current bearing wires, but it is to be understood that any other form of motor may be substituted for the electric motor illustrated.

A roller 15 is disposed above the roller 9 on a spindle 16 and is adjustably mounted to resiliently coöperate with the roller 9 by means of a spring 17 to one end of which the spindle 16 is secured, the other end being rigidly secured to the extension 18 of the standard 19. A screw 20, threadedly engaging the standard 19 provides for adjustment of the tension of the spring 17. As will be readily understood, when the tape is disposed between the rollers 9 and 15 and the motor 13 is in operation the tape will be moved longitudinally through the instrument.

Secured to the base 1 adjacent the brackets 3 is a standard 21 supporting the guide members 22 which embrace the tape and maintain it in proper relation to the base 1 regardless of the diameter of the roll 6. The pen 23 is adjustably mounted in an arm 24 which is in turn adjustably mounted on a support 25 secured to the base 1, the pen 23 being so disposed as to engage the taper as it is drawn through the guide members 22. The pen 23 may be of any suitable construction and is preferably supplied with ink from a reservoir 26.

An electro-magnet 27 is suitably secured to the base 1 and adapted to receive current impulses from any suitable source, the binding posts 28 being mounted on the base 1 to which the current-bearing wires may be secured. The electro-magnet 27 is provided with an armature 29 pivotally mounted at 30 and normally held from engagement with the cores 31 of the electro-magnet 27 by means of a spring 32 secured to a standard 33 on the base 1 and to one end of the armature 29. At the opposite end of the armature 29 a yoke 34 is secured which embraces the tape so that the latter is moved laterally as the armature vibrates under the influence of current impulses received by the electro-magnet 27.

The operation of my improved recorder should be apparent without further description of the structure thereof. As the shaft 12 of the motor 13 rotates the roller 9, coöperating with the roller 15, draws the tape through the instrument at a constant speed and the pen 23 resting on the tape will mark a straight line thereon which is substantially parallel with one of the edges of the tape. As each current impulse is received by the electro-magnet 27 the armature 29 will be attracted and drawn toward the electro-magnet 27, carrying with it the yoke 34 and hence moving the tape laterally. The result will be that with each current impulse the normally straight line will be broken and a series of markings, such as indicated in Fig. 1, will appear on the tape indicating the duration of the current impulses and thereby indicating to persons familiar with the code the ideas which are being telegraphically transmitted and received by the instrument.

It will be readily understood from the foregoing that I have succeeded in perfecting a recorder which eliminates completely the necessity for providing a moving or a balanced pen and that consequently the disadvantages of such structures as known in the prior art have been entirely overcome.

My recorder is extremely simple in construction and will operate efficiently for long periods without attention or adjustment other than the replacement of the tape as the roll becomes exhausted.

It will be obvious that various changes may be made in the form, construction and arrangement of the parts without departing from the spirit and scope of the invention or sacrificing any of its material advantages, the form hereinbefore described being merely a preferred embodiment thereof.

I claim:

1. In a recorder, the combination of means for drawing a tape at a constant speed therethrough, a fixed member constantly engaging said tape and adapted to mark thereon, means for shifting the tape laterally to vary the character of the marking, and means for returning the tape to its normal position after each shifting operation.

2. In a recorder, the combination of means for drawing a tape at a constant speed therethrough, a fixed member constantly engaging said tape and adapted to mark thereon, electro-magnetic means for shifting the tape laterally to vary the character of the marking, and means for returning the tape to its normal position after each shifting operation.

3. In a recorder, the combination of means for drawing a tape at a constant speed therethrough, a fixed member engaging said tape and adapted to mark thereon, an electro-magnet adapted to receive current impulses, an armature therefor, and means connected to said armature and embracing the tape, whereby the latter is moved laterally as each current impulse is received to vary the character of the marking.

4. In a recorder, the combination of means for drawing a tape at a constant speed therethrough, a pen having a constant ink supply fixedly mounted to engage and mark said tape, an electro-magnet adapted to receive current impulses, an armature therefor, and a yoke connected to said armature and embracing the tape, whereby the latter is moved laterally as each current impulse is received to vary the character of the marking.

5. In a recorder, the combination of a base, means thereon for supporting a roll of tape, a motor and means actuated thereby to draw the tape through the recorder at a constant speed, a pen having a constant ink supply fixedly mounted to engage and mark said tape, an electro-magnet adapted to receive current impulses, an armature therefor, and a yoke connected to said armature and embracing the tape, whereby the latter is moved laterally as each current impulse is received to vary the character of the marking.

6. In a recorder, the combination of a base, means thereon for supporting a roll of tape, a motor, a pair of rolls between which the tape is disposed, means for actuating one of said rolls from said motor to draw the tape through the recorder at a constant speed, a pen having a constant ink supply fixedly mounted to engage and mark said tape, a guide embracing said tape as it passes to the pen, an electro-magnet adapted to receive current impulses, an armature therefor, and a yoke connected to said armature and embracing the tape, whereby the latter is moved laterally as each impulse is received to vary the character of the marking.

7. In a recorder, the combination of a base, means thereon for supporting a roll of tape, a pair of rolls between which the tape is disposed, means for actuating one of said rolls to draw the tape through the recorder at a constant speed, means for adjusting the pressure exerted by the other of said rolls on said tape, a pen having a constant ink supply fixedly mounted to engage and mark said tape, an electro-magnet adapted to receive current impulses, an armature therefor, and a yoke connected to said armature and embracing the tape, whereby the latter is moved laterally as each current impulse is received to vary the character of the marking.

RAY E. HALL.

Witnesses:
ERNEST H. MERCHANT,
M. A. KIDDIE.